United States Patent [19]

Wilcock

[11] 4,227,752
[45] Oct. 14, 1980

[54] STAGED BEARING SURFACE COMPLIANCE FOR HYDRODYNAMIC FLUID BEARING

[75] Inventor: Donald F. Wilcock, Schenectady, N.Y.

[73] Assignee: Mechanical Technology Incorporated, Latham, N.Y.

[21] Appl. No.: 974,258

[22] Filed: Dec. 29, 1978

[51] Int. Cl.³ .................... F16C 17/06; F16C 32/06
[52] U.S. Cl. .................................... 308/9; 308/160
[58] Field of Search ............... 308/9, 15, 135, 139 R, 308/140, 158, 160, 163, 164, DIG. 1

[56] References Cited

U.S. PATENT DOCUMENTS

| | | | |
|---|---|---|---|
| 1,422,448 | 2/1922 | Kingsbury | 308/160 |
| 3,142,519 | 2/1964 | Abramovitz | 308/160 |
| 3,620,582 | 11/1971 | Sato et al. | 308/160 |
| 4,026,613 | 5/1977 | Moravchik | 308/160 |
| 4,116,503 | 9/1978 | Licht | 308/9 |

Primary Examiner—Frederick R. Schmidt
Attorney, Agent, or Firm—Joseph V. Claeys; John M. Neary

[57] ABSTRACT

A hydrodynamic fluid bearing includes a pivoted shoe which can tilt in response to the hydrodynamic fluid forces generated between the bearing surfaces, and a locally conformable bearing layer attached to the shoe facing the opposing bearing surface. The pivoted shoe can pivot to conform to changes in the pitch of the opposing bearing surface and can tilt to the correct slope to generate the hydrodynamic supporting fluid wedge, and can also conform to the shape of the opposing bearing surface if it becomes thermally distorted or "dished". The compliant layer at the top surface of the shoe can conform to smaller area bearing irregularities, and in addition, can locally conform under hydrodynamic forces to assume the ideal configuration to generate the optimum hydrodynamic wedge. The support on which the pivoted shoe is mounted can itself be pivoted on a gimbal ring to provide large area compliance with the bearing surface to follow, if necessary, precession or other large scale runout of the bearing surface. Each stage of the compliant support can be designed to give the stiffness and damping best suited for that stage of support.

11 Claims, 6 Drawing Figures

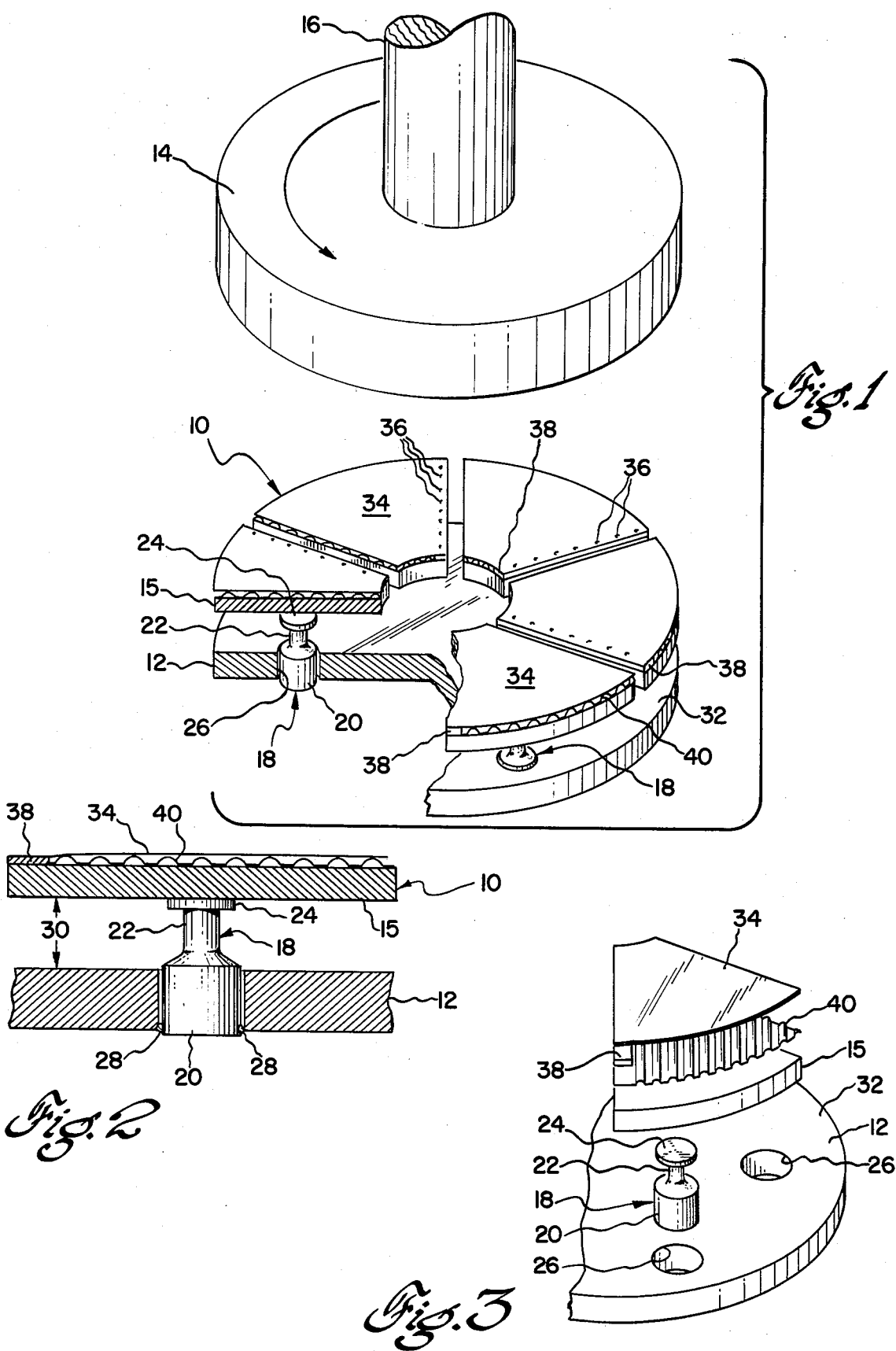

STAGED BEARING SURFACE COMPLIANCE FOR HYDRODYNAMIC FLUID BEARING

BACKGROUND OF THE INVENTION

The field of gas bearings has long been considered theoretically ideal for large ultrahigh speed machinery. However, it has been disappointing in practice because the load carrying capacity of bearings of this nature, which theoretically should be great, has been found in practice to be disappointingly small. I have ascertained some of the causes for this disappointing performance and avoided them with a gas hydrodynamic bearing capable of supporting heavier loads at high speed.

Hydrodynamic fluid bearings are essentially of two varieties: (a) hard surface types, and (b) compliant surface types. The hard surface types include (1) plane surface; (2) contoured surface types, such as spiral groove, tapered-land, step, pocket; and (3) tilt pad. Hydrodynamic supporting fluid films are generated over hard surface types by dragging the lubricating fluid, whether it be oil, water or air, by viscous shear forces, into a converging space between the two bearing members. The shape of that space is determined, in the case of plane and contoured surface types, by the profile to which the bearing surfaces are machined, and also by the position and orientation of the bearing surface of the rotating member. The tilt pad type employs a pad mounted on a pivot which enables the tilt pad to tilt under the influence of hydrodynamic forces acting on it to assume a slope that will cause a supporting hydrodynamic fluid film to be generated.

The compliant surface type of bearing employs a compliant support layer which supports a flexible bearing sheet such as a thin sheet of stainless steel. Under the influence of relative movement between the opposing bearing surface and the bearing sheet, hydrodynamic forces are generated which depress the compliant support and the overlying bearing sheet to a profile that is conducive for generating a supporting hydrodynamic fluid film between the opposing bearing surface and the bearing sheet.

The hydrodynamic supporting fluid film is created by the viscous or shear forces acting in the fluid parallel to the direction of relative movement between the two bearing surfaces. A rotating thrust runner, for example, drags its boundary layer of air with it as it rotates opposite to a tilt pad. The boundary layer, in turn, drags in the immediately adjacent layer of air, and so forth. In this way, an air velocity gradient is established in the gap between the thrust runner and the tilt pad. The pad is supported at about 58% of its length in the direction of rotation of the thrust runner and tilts away from the thrust runner at its leading edge. This creates a wedge-shaped gap between the thrust runner and the pad which causes the fluid being dragged into the wedge to increase in pressure toward the trailing edge of the tilt pad. This pressure increases gradually to a maximum at approximately ¾ of the pad length from the leading edge.

In the same way, compliant surface bearings also create a hydrodynamic supporting fluid wedge by viscous drag of the boundary layer exerted by the relative movement between the rotor bearing surface and the compliant bearing surface. A zone of high pressure fluid is created which provides the fluid support to maintain the separation between the opposing bearing surfaces.

A pressure curve showing the distribution of pressure over a hard, tilt pad bearing surface reveals that the pressure increases gradually from the leading edge of the wedge shaped gap between the opposing bearing surfaces to a maximum at about ¾ of the length, then falls off steeply. This pressure curve inherently results in a peak. Although the maximum pressure in the supporting fluid film might be high, the total supporting force is not high because of the nonuniform pressure distribution over the surface of the bearing. The pressure curve over a compliant bearing module reaches an early maximum pressure which is maintained over a substantial portion of the module surface area before falling off steeply at the end of the module. The total supporting force over the compliant bearing module is higher than that over the rigid tilt pad because the area under the compliant bearings's pressure curve is considerably greater than the area under the tilt pad's pressure curve, even though the maximum pressure over the compliant bearing may be less.

One of the advantages of gas bearings is their ability to operate in high temperature environments. However, it is common for a thrust bearing to operate in a very uneven temperature condition, with the thrust runner being hotter at its bearing face than on the opposite face, establishing a temperature gradient across the bearing member in an axial direction. The higher temperature zone at the bearing face causes the material of the bearing to expand nonuniformly and produce a convex shape of the bearing face. This thermal distortion of the bearing surface has an adverse effect in the hydrodynamic action at the bearing interface which no longer has the optimum wedge for generating the hydrodynamic supporting fluid film. In effect, the distortion reduces the bearing surface and transfers the entire load to the portion of the bearing surface which has not been bowed away from the opposed bearing surface by thermal distortion. The smaller effective bearing surface now must carry the same load, and the resulting greater pressure may exceed the load bearing capacity of the bearing. This condition may be further exacerbated by misaligned loads on the thrust bearing. Where the shaft tilts or precesses under the misaligned load, one edge of the thrust runner lifts away from the thrust plate and the entire axial load must then be borne by the opposite edge.

The damping effect of hydrodynamic fluid bearings is theoretically ideal for ultrahigh speed applications. However, the runout excursions which should be damped by the bearing, may be of a nature which do not coincide with the bearing's damping characteristics. Thrust runner excursions exerted on a thrust bearing can vary widely in frequency amplitude and direction. In addition, fluid effects, such as half speed whirl, can exist in the lubricating fluid itself to complicate the situation. Failure of a bearing can occur when the power of the rotor runout excursions exceeds the damping capacity and misalignment tolerance of the bearing, such as when a rotor, passing through its critical velocity, experiences runout of such amplitude that the hydrodynamic fluid film is breached and the bearing surfaces contact each other at high relative speed.

Many prior art hydrodynamic bearings have been unsuccessful because of the lack of understanding of what occurs in the bearing interface and how the complex forces acting on the bearing interact and affect the hydrodynamic action of the bearing. When solutions are proposed, they are usually focused on a single, perceived problem in the bearing and fail to account for the other effects. I have designed a bearing which accounts for the factors which are most influential in the operation of the hydrodynamic fluid bearing and which solve the problems which most seriously affect its load bearing capacity.

SUMMARY OF THE INVENTION

Accordingly, it is an object of this invention to provide a hydrodynamic fluid bearing having a high load carrying capacity. This bearing can be used in high speed heavy machinery applications with long and reliable operation. It is tolerant of misalignment, vibration, and thermal distortion of the thrust runner, and it can function in extremely hostile environments such as high temperature, low temperature, steam and corrosive conditions which would quickly destroy conventional bearings. It is quiet running and its damping characteristics can be matched to correspond to the damping requirements of the application.

Although this bearing is inherently cool running and efficient because it absorbs little energy from the rotor which it supports, its design facilitates easy supplemental cooling of the bearing members if needed. Although this bearing gives superior performance, it is actually more economical to manufacture than bearings far inferior in performance. It does not require high precision machining or exotic bearing materials and indeed it is amenable to high volume production techniques. In addition to ease and speed of construction, the inspection, replacement, and repair of this bearing is easy and quick and does not require precision alignment or extensive disassembly of the machine in which it is being used.

These objectives are achieved by one embodiment of this invention which employs a series of tilt pads, each of which includes a compliant bearing layer. The pads themselves will self-adjust and conform to the slope of the opposing bearing surface, and the compliant bearing surface on the pad will self-adjust to the smaller scale local bearing surface and automatically assume the ideal profile to produce a uniform, high capacity hydrodynamic supporting fluid film.

Another embodiment contemplates mounting the thrust plate, on which the tilt pads are mounted, on a gimbal to enable the plate itself to follow precession and other large scale deflections of the thrust runner, and to flex axially in response to axial shocks exerted by the rotor on the bearing.

The stiffness of each support stage in the two embodiments is designed to properly contribute to the desired overall stiffness of the bearing combination. Thus, for example, the stiffness of the large scale support stage such as the gimbal arrangement for the thrust plate must be selected to complement the stiffness of the smaller stages, otherwise the large scale support stage will act like a rigid support, or will make the smaller scale stages act like rigid supports. Thus, this bearing provides the maximum hydrodynamic supporting fluid film generating capability with minimum heat generation and energy losses, while permitting damping characteristics for the application involved.

DESCRIPTION OF THE DRAWINGS

The invention and its objects will be better understood by reference to the following description of the preferred embodiment when read in conjunction with the following drawings, wherein:

FIG. 1 is a perspective view, partly in section, of a bearing in accordance with this invention;

FIG. 2 is an elevation, partly in section, of one of the tilt pad assemblies shown in FIG. 1;

FIG. 3 is an exploded perspective view of the tilt pad assembly shown in FIG. 2;

DESCRIPTION OF THE PREFERRED EMBODIMENT

Figure 6:
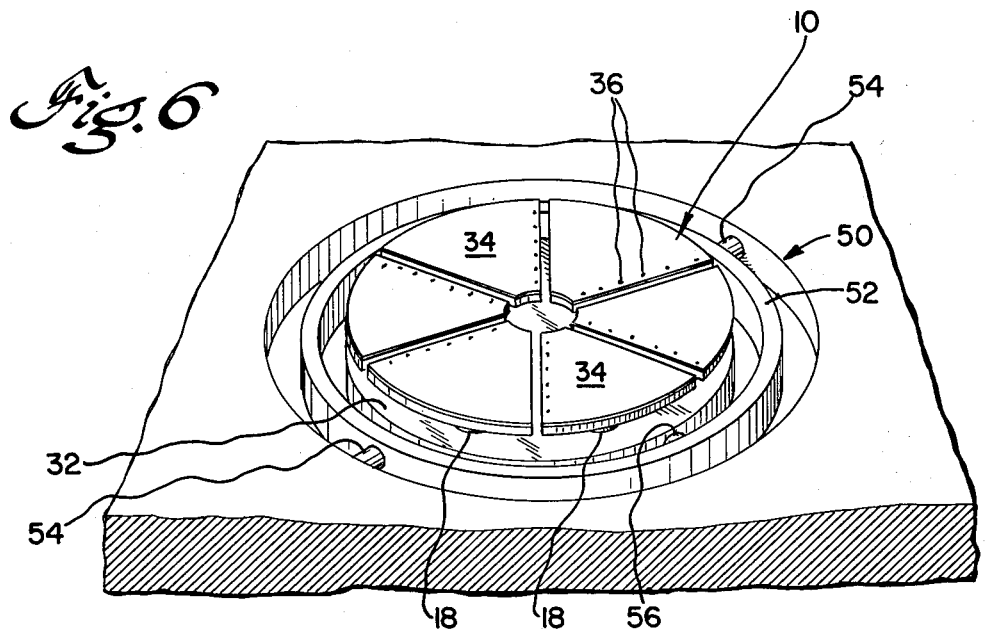
FIG. 6 is a perspective view, partly in section, showing a second embodiment of a bearing constructed in accordance with this invention.

Referring now to the drawings, wherein like reference characters designate identical or corresponding parts, and more particularly to FIG. 1 thereof, a bearing assembly having a series of tilt pad assemblies 10 mounted on a thurst plate 12, is shown facing a thrust runner 14 mounted on a rotating rotor 16.

Looking now at FIGS. 2 and 3, each tilt pad assembly 10 includes a tilt pad body 15 supported on a flexure support 18 mounted on the thrust plate 12. The flexure support 18 includes a single mounting stalk having lower cylindrical base portion 20 and an upper reduced portion 22 attached to the tilt pad body 15 by a weld flange 24 formed at the top of the reduced portion 22. The lower cylindrical portion 20 fits into a cylindrical bore 26 formed in the thrust plate 12 and is welded at 28 to the thrust plate 12 to secure it permanently in position. To insure the proper spacing 30 and angular orientation between the tilt pad 10 and the thrust plate 12, and to insure that the several tilt pads in the thrust bearing assembly are exactly coplanar, an alignment jig (not shown) may be inserted between the underside of the tilt pad 10 and the top surface 32 of the thrust plate prior to welding the cylindrical portion 20 to the underside of the thrust plate 12 at 28. The alignment jigs are then removed after the welding has been completed.

The particular form of flexure support illustrated is employed where conventional lubrication is impracticable, for example, because of high temperature. In situations where lubrication of a ball and socket support for the tilt pad 10 is possible, it may be substituted for the flexure support 18.

The bearing surface of the tilt pad assembly 10 is provided by a flat flexible sheet 34 of bearing material such as stainless steel of Iconal, which may also be coated with an antifriction coating such as molybdenum disulfide or, in high temperature applications, a proprietary coating known by the trademark "HL-800" sold by Mechanical Technology Incorporated, of Latham, New York. "HL-800" includes a mixture of cadmium dioxide and graphite in a thin flexible ceramic matrix. Its composition and method of application are disclosed in the co-pending application of Bharat Bhusan Ser. No. 974,264 entitled "High-Temperature Low-Friction Surface Coating" filed concurrently herewith. The flexible sheet 34 of bearing material is attached to the leading edge (in the sense of the rotation direction of the thrust runner 14) by spot welding, seam welding or the like at 36 to a spacer block 38. The sheet 34 of bearing material is resiliently supported by a resilient supporting structure 40, shown here as a sheet of Inconal X-750 formed in a corrugated pattern to produce a series of regular wave forms which can yield locally or over a wide area to give resilient and conformable support for the sheet 34 of bearing material.

The spacer block 38 may be welded to the tilt pad body 15 over the leading edge of the corrugated sheet to secure the bearing layer assembly together and in place on the tilt pad.

The underside of the sheet 34 may be treated with friction enhancing material or may be etched, sand blasted or otherwise treated or machined to provide a friction enhancing texture to the surface. Likewise both surfaces of the resilient supporting structure 40 and the top surface of the tilt pad body 15 may be similarly treated to enhance the frictional characteristics of the surfaces. The purpose of this treatment is to provide optimal frictional or coulomb damping between these surfaces. Vibrations transmitted to the sheet 34 of bearing material from the thrust runner 14 will cause the resilient support member 40 to flatten slightly, which has the effect of spreading the area of the support member 40. The peaks and valleys of the corrugations thus travel laterally in small displacements with respect to the underside of the sheet 34 of bearing material and the topside of the tilt pad body 15. This slight rubbing of surfaces over a relatively wide area provides an ideal mechanism for damping high frequency vibrations.

The angular stiffness of the flexure support of the tilt pad 10 is selected to complement the stiffness of the support element 40. It is desirable that the angular stiffness of the flexure 22 be about one-half to one-tenth of the angular stiffness of the support element 40. The lower limit of twice the angular compliance of the element 40 is based on the need to "save" the element 40 for small scale deflections. Otherwise the deflections necessary to produce the gross or large scale deflections of the tilt pad would be partially contributed by the element 40, so the full range of deflection of the element 40 would not be available for the small scale adjustments in bearing sheet height that the element 40 is ideally suited to provide. The greater angular compliance of the flexure 22 enables the large scale deflections of the pad in following the runout excursions of the rotor to be carried out by the flexure instead of the support element 40 whose range of motion is much smaller than that of the flexure 22. The upper limit of the flexure angular compliance is actually imposed by its minimum vertical stength. It must be strong enough to support the axial force exerted on the pad 10 by the thrust runner 14.

Figure 4:
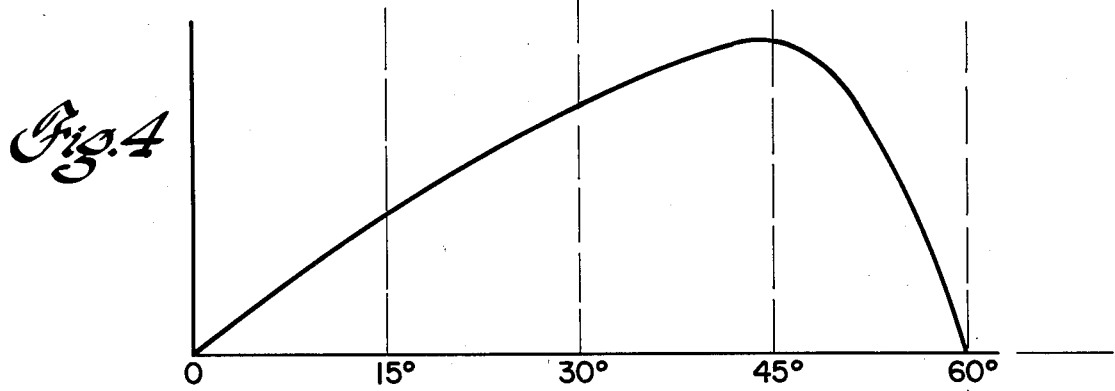
FIG. 4 is a pressure curve showing the pressure distribution over the surface of a conventional tilt pad bearing.
Figure 5:
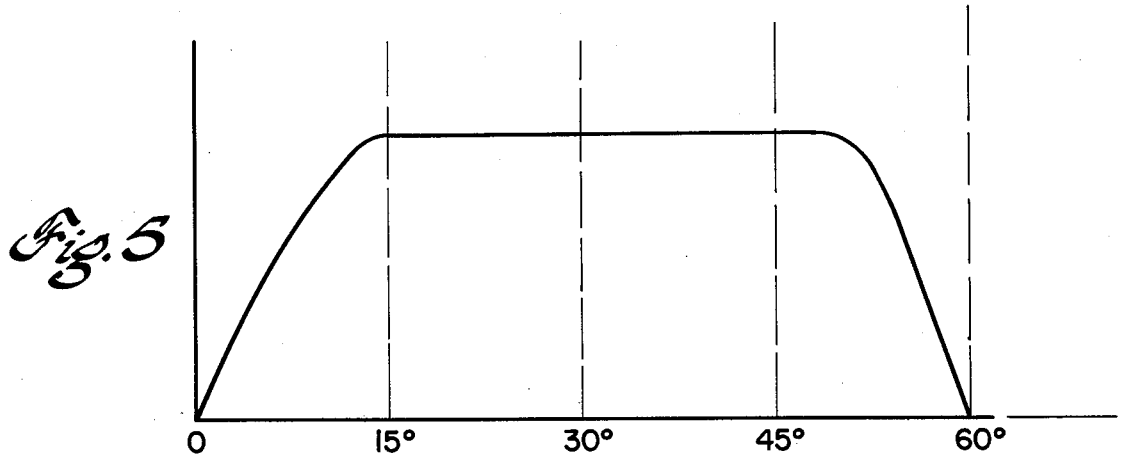
FIG. 5 is a pressure curve showing the pressure distribution over the bearing in accordance with this invention.

In addition to the two stages of bearing surface compliance and damping shown in FIGS. 1-5, it may be desirable to add one or more additional stages of damping and/or compliance in some applications. A third stage providing large scale surface compliance is provided by gimbaling the thrust plate 12 in gimbal ring 50. The gimbal ring 50 includes a ring 52 which is supported for rotation about an axis defined by the axis of pivots 54 supported by the machine on which this bearing is used. The ring 52 carries a second set of pivots 56 mounted in the same plane as the ring 52 and orthogonally disposed to the axis of the pivots 54 so that the thrust plate 12, which is carried by the pivots 56, can rotate about the axis of the pivot 56 and can also rotate, by virtue of the pivotal support of the ring 52, about the axis of pivots 54 at right angles to the axis of the pivot 56. Therefore, the thrust plate 12 can tilt in any direction to follow the tilting or precession of the thrust runner 14. In addition, the pivots 54 and 56, and the ring 52 can be manufactured with a stiffness designed to give the optimum resilience in an axial direction to enable the bearing to flex axially in the event of axial shocks to the rotor. The rotor is thus protected from permanent damage which could occur in the event of a rigid mounting.

The pivots 54 and 56 can be provided with a damping mechanism such as coulomb damping. In addition, damping may be provided to the thrust plate 12 by other means, such as an elastomer pad or other energy absorbing material positioned on the back side of the thrust plate 12 between it and its support.

If the maximum vibration excursions which the thrust plate 12 will experience are small enough that the gimbal ring mounting shown is unnecessary, the thrust plate 12 may be mounted directly on a resilient support such as an elastomer block, which would permit the thrust plate to rock in response to the large scale vibration which it experiences. The material used will depend on the desired damping characteristics and axial load which the thrust plate 12 will carry. In addition, environmental factors such as temperature, chemicals present and life expectancy will influence which material is to be used. Obviously, numerous modifications and variations of the disclosed embodiments will occur to those skilled in the art.

It is to be expressly understood that these and other modifications and their equivalents may be practiced while remaining within the spirit and scope of the invention defined in the following claims, wherein I claim:

1. A resilient compliant hydrodynamic fluid bearing, comprising:

a stationary member and a relatively movable member, said members defining therebetween a gap;

a plurality of pads supported by said stationary member for tilting about axes parallel to the plane of said stationary member;

each of said pads having a compliant bearing layer in opposed relationship to an opposing bearing surface on said movable member;

said compliant bearing layer including a thin, flexible bearing sheet having a bearing surface on one side thereof facing said opposing bearing surface, and a resilient, compliant supporting structure underlying said bearing sheet on the other side thereof for resiliently supporting said bearing sheet while permitting local deflections thereof; and flexure mounting means for tiltably mounting said pads on said stationary member to enable said pads to conform to large scale changes in the slope of said opposing bearing surface and to automatically maintain the correct large scale orientation of said bearing sheet while said compliant bearing layer resiliently deflects to respond to hydrodynamic fluid forces existing between said bearing surfaces to cause said bearing sheet to assume a profile that is conducive to the establishment and maintenance of supporting hydrodynamic fluid films between said bearing surface, said flexure having an angular stiffness greater than one tenth of the angular stiffness of said compliant supporting structure.

2. The bearing defined in claim 1, further comprising a gimbal ring for supporting said stationary member for tilting about any axis perpendicular to the axis of rotation of said movable member.

3. The bearing defined in claim 1, wherein said bearing is a thrust bearing supporting said movable member in the direction of its axis of rotation, said stationary member is a thrust plate, said movable member is a thrust runner; and said flexure mounting means includes a single stalk for each of said pads, each of said stalks being fastened at the base thereof to said thrust plate, and being fastened at the end remote from said base to one of said pads, and having an intermediate reduced portion for flexing.

4. The bearing defined in claim 3, further comprising a gimbal ring connected to said thrust plate for axially supporting said thrust plate while permitting said thrust plate to tilt about all axes perpendicular to said axis of rotation.

5. The bearing defined in claim 1, wherein said flexure mounting means includes a single stalk for each of said pads, said stalk being connected at a base end thereof to said stationary member and connected at the end remote from said base end to said pad, said stalk extending between said stationary member and said pad in the direction perpendicular to said opposing bearing surface and its direction of rotation.

6. The bearing defined in claim 1, wherein said flexure mounting means has an angular compliance at least twice as great as the angular compliance of said supporting structure.

7. A resilient compliant hydrodynamic fluid bearing, for dynamically supporting a high speed rotating rotor having a rotor bearing surface, comprising;
   a flexible bearing sheet having a bearing surface in opposed relationship to said rotor bearing surface;
   a supporting structure for supporting said sheet bearing surface, and including a plurality of support stages arranged in series;
   said support stages compliantly supporting said bearing sheet so that said sheet bearing surface can conform to said rotor bearing surface and deflect under the influence of the hydrodynamic fluid forces exerted by the fluid films between said bearing surfaces to establish and maintain the correct slope of said sheet bearing surface with respect to said rotor bearing surface;
   one of said support stages supporting the next support stage and indirectly supporting the entire sheet bearing surface, said one support stage including at least one first form support modality;
   said next support stage operatively supporting a large sheet bearing surface and including more than one second form support modality;
   said first form support modality supporting more than one second form modality so the area of said sheet bearing surface operatively supported by each of said first form modalities is greater than the area of said sheet bearing surface operatively supported by each of said second form support modalities;
   said one support stage having an angular stiffness greater than about one tenth of the angular stiffness of said next support stage.

8. The bearing claimed in claim 7 wherein the angular stiffness of each of said support stages is greater than the angular stiffness of support stages which operatively support a greater bearing surface area.

9. The bearing defined in claim 7, wherein
   said second form support modalities include resilient raised projections formed on a thin metal sheet; and
   said one support modality includes a pad plate mounted on a flexure that permits said pad plate to tilt about all axes parallel to said rotor bearing surface.

10. The bearing defined in claim 9, wherein
    said bearing is a thrust bearing, said rotor is a thrust runner, and said one support stage further comprises a thrust plate mounted on a gimbal ring mount for supporting said thrust plate and permitting tilting movement of said thrust plate about axes parallel to the plane of said thrust runner.

11. A method of dynamically supporting a high speed rotating rotor, comprising:
    supporting a flexible bearing sheet in bearing relationship to the rotor on a first compliant support element which enables said bearing sheet to flex and conform to the surface of the rotor, and also to deflect under the influence of hydrodynamic fluid forces generated by rotation of the rotor in close proximity to the bearing sheet;
    supporting said compliant support element on a second compliant support element that has an angular stiffness greater than about one tenth of the angular stiffness of said first compliant support element, and enables said first compliant support element to move as a unit and follow large scale deviations of the rotor under influence of rotor unbalance and eccentric loads.

* * * * *